A. A. BINGHAM & W. H. ASHFIELD.

Caps for Pepper and Salt Boxes.

No. 134,455.  Patented Dec. 31, 1872.

Witnesses:
E. W. Bates.
Jno. Williams

Inventors:
Alonzo A. Bingham
William H. Ashfield

UNITED STATES PATENT OFFICE.

ALONZO A. BINGHAM AND WILLIAM H. ASHFIELD, OF SYRACUSE, N. Y.

IMPROVEMENT IN CAPS FOR PEPPER AND SALT BOXES.

Specification forming part of Letters Patent No. 134,455, dated December 31, 1872.

*To all whom it may concern:*

Be it known that we, ALONZO A. BINGHAM and WILLIAM H. ASHFIELD, both of the city of Syracuse and county of Onondaga and State of New York, have invented certain new and useful Improvements in Coupling Attachment for Pepper and Salt Boxes, &c.; and we do hereby declare that the following is a full, clear, and exact description thereof, that will enable others skilled in the art to which it appertains to make and use the same, reference being had to the accompanying drawing and to the letters of reference marked thereon which form a part of this specification.

This invention has relation to couplings for the straining or sifting caps or attachments of kitchen utensils, such as pepper or salt boxes, tea and coffee pots, and the like; and consists in the construction and novel arrangement of a pair of correspondingly-threaded and internally-flanged annular coupling-sections, designed to be applied to the neck of a salt or pepper box, or to the spout of a tea or coffee pot, or other household utensil, the contents of which require sifting or filtering, and holding between their internal flanges a piece of wire-cloth as the sifting or filtering medium, all substantially as hereinafter more fully described.

Figure 2:
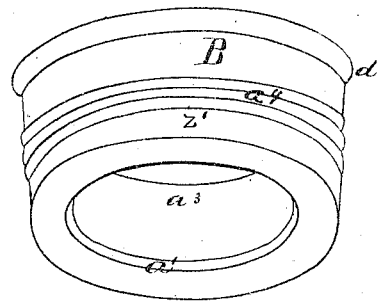
Figure 1:
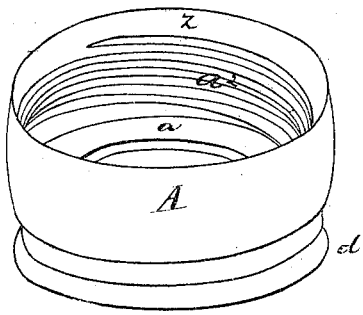
Figure 3:
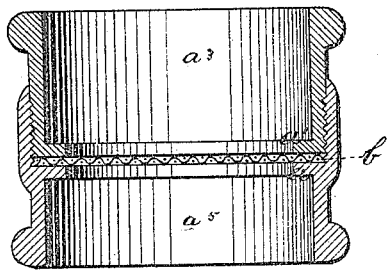

Referring to the drawing, A B designate the coupling-sections, of annular form and of a size suited to the character of the utensil to which they are applied. The section A is the longer of the two and is constructed with an inwardly-projecting or internal flange or shoulder, $a$, centrally located and annular-shaped, as represented in the drawing, Figs. 1 and 2. Between this flange or shoulder and one end of the section A is formed a female-screw thread, to which fits a male-screw thread, formed on the external surface of the section B. The section B is of a conoidal form, converging very slightly toward its inner end, but sufficiently, however, to allow it to fall a slight distance into the section A before the screw-threads engage with each other, and to produce a very close joint when the coupling is completed. The threads terminate at a short distance from the ends of the sections, as shown at $z$ $z'$, to further facilitate the coupling of the sections, by causing the threads to come together at once, and thus obviating the necessity of feeling for the thread. $b$ designates a circular piece of wire-cloth, which is placed upon the shoulder $a$ and afterward secured rigidly by means of the shoulder $a^1$. These shoulders thus produce a close-enough joint to prevent the contents of the vessel to which the coupling is applied, from entering the same, and leaking and obtaining access to the threads, or escaping from the vessel without the desired straining or filtering.

When the wire-cloth becomes worn or clogged it may be taken out by uncoupling the sections, and repaired or a new piece substituted.

The device composed of the sections and wire-cloth is reversible—that is, either end may be applied and secured to the vessel for which it is intended, appropriate spaces or sockets $a^3$ $a^5$ being left between the flanges or shoulders $a$ $a^1$ and the ends of the sections. While one of said sockets receives the end of the neck or spout of the vessel the other may be used to hold a cork or stopper, and one of said sockets may well be made larger in diameter than the other, thus adapting the device to use on vessels having various-sized necks or spouts. The shoulders $d$ $d$ on the outside of the sections are for the convenience of manipulating the latter.

The coupling herein described is designed to be applied as a cap with or without being soldered or cemented, so that it may be detached at will.

What I claim as new, and desire to secure by Letters Patent, is—

The section A having the internal centrally-located flange $a$, female-screw thread $a^2$, smooth surface $z$, and socket $a^3$, in combination with the conoidal section B having the male thread $a^4$, smooth surface $z'$, and socket $a^5$, and the removable wire-cloth $b$, all substantially as and for the purpose specified.

In testimony that we claim the foregoing we have hereunto set our hands this 10th day of December, 1872.

ALONZO A. BINGHAM.
   WILLIAM H. ASHFIELD.

Witnesses:
 GEO. H. MARVIN,
 LODOWICK VANARSDALE.